J. N. KELLY.
STEERING MECHANISM.
APPLICATION FILED JUNE 9, 1919.

1,341,326.

Patented May 25, 1920.
3 SHEETS—SHEET 1.

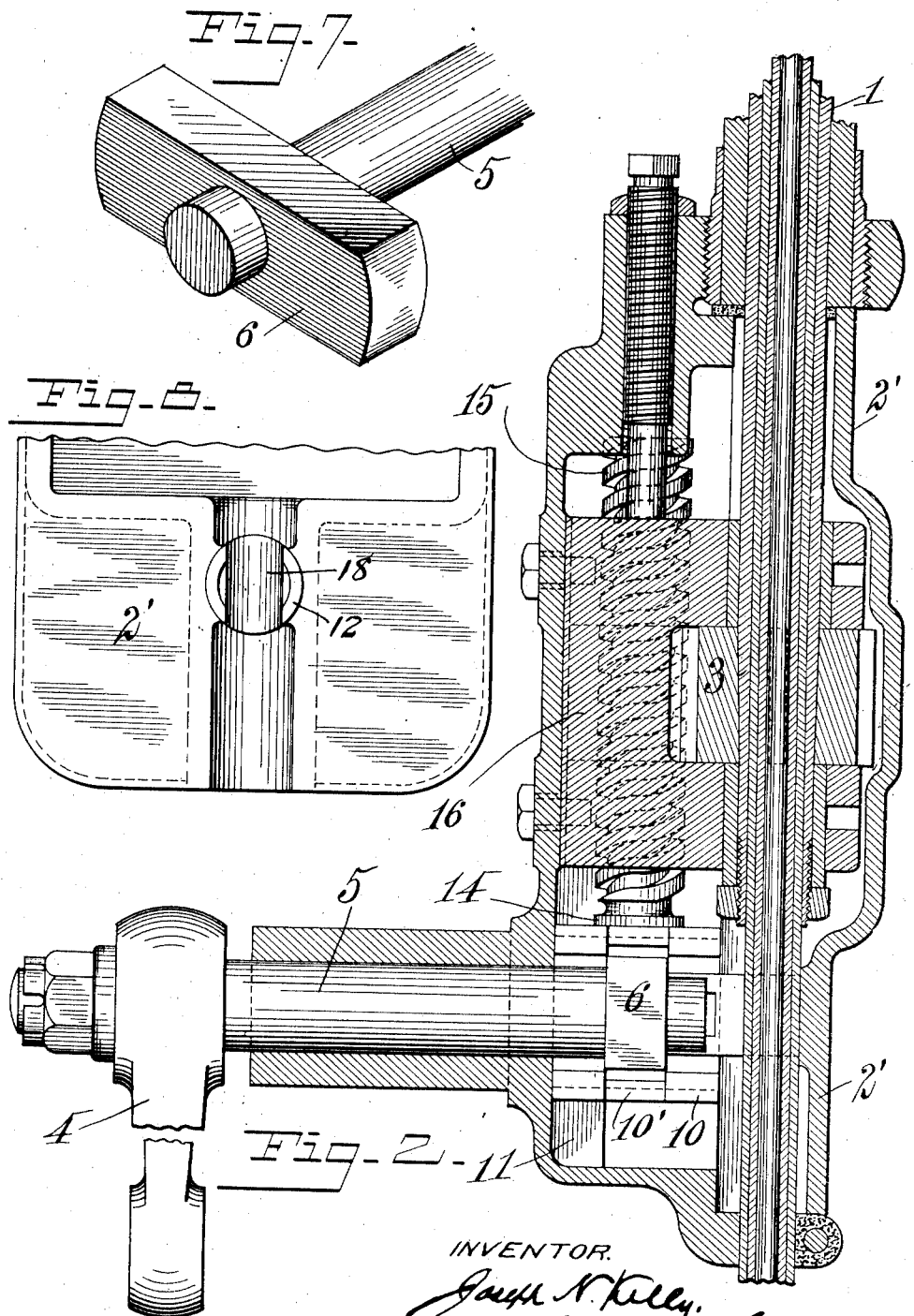

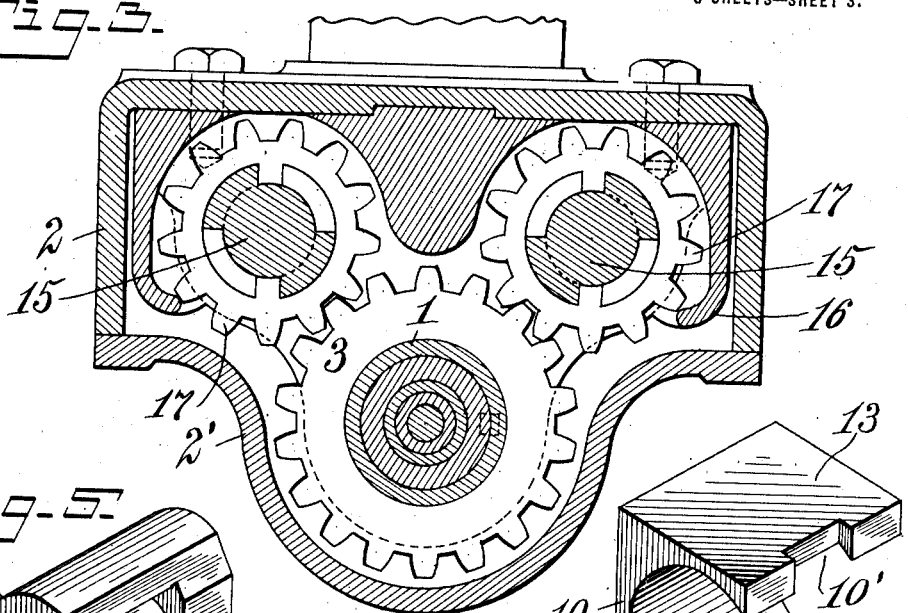
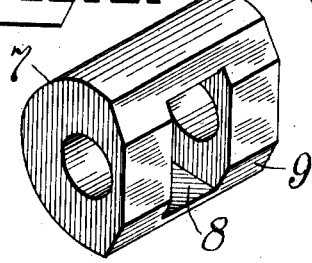
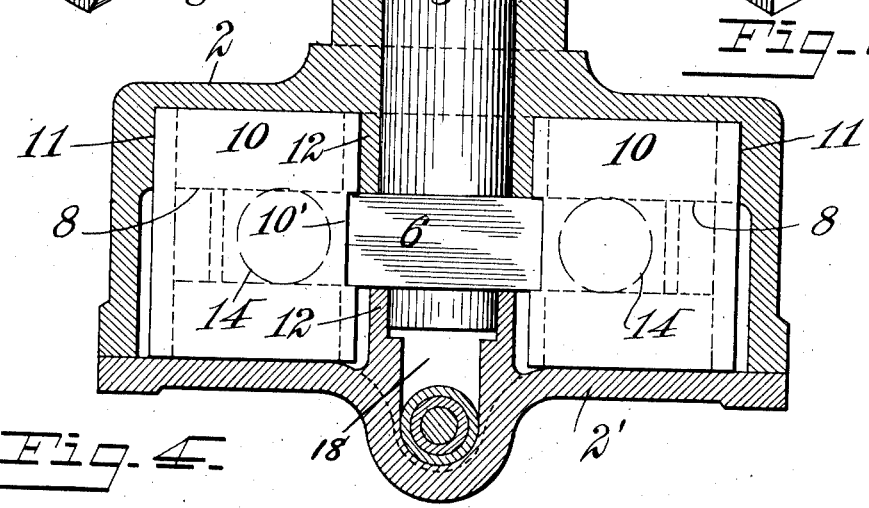

UNITED STATES PATENT OFFICE.

JOSEPH N. KELLY, OF DAYTON, OHIO, ASSIGNOR TO OHMER FARE REGISTER COMPANY, OF DAYTON, OHIO.

STEERING MECHANISM.

1,341,326.     Specification of Letters Patent.     Patented May 25, 1920.

Application filed June 9, 1919. Serial No. 302,771.

*To all whom it may concern:*

Be it known that I, JOSEPH N. KELLY, a citizen of the United States, residing at Dayton, in the county of Montgomery and State of Ohio, have invented certain new and useful Improvements in Steering Mechanism, of which the following is a specification.

This invention relates to steering mechanism particularly for motor driven vehicles. The invention comprises certain improvements in the steering gear mechanism shown and described in Letters Patent of the United States, granted to me on January 14th, 1919, under Number 1,291,017. The present improvements comprise a more advantageous form of oscillating and slidable mechanism arranged between the rocker arm and screw shafts, the object being to enhance the efficiency of the mechanism and to further improve it in the light of experience, as shall more fully appear from a particular description thereof to follow in connection with the accompanying drawings.

Referring in general terms to the said drawings,

Fig. 2 is a central longitudinal section of the said steering mechanism.

Fig. 3 is a cross section on the line 3—3 of Fig. 2, parts being omitted as indicated by the broken line.

Fig. 4 is a cross section approximately on the line 4—4 of Fig. 1 with the cover plate in position.

Fig. 5 is a perspective view of one of the pivotal or oscillatory members or motion transmission members.

Fig. 6 is a similar view of one of the slidable holders for the said pivotal members.

Fig. 7 is a perspective view of the rocker shaft and attached cross arm.

Fig. 8 is a view of the inside face of the lower portion of the cover plate.

In the particular description to follow, similar reference numerals will be employed to designate corresponding parts in the several views of the drawings.

Figure 1:
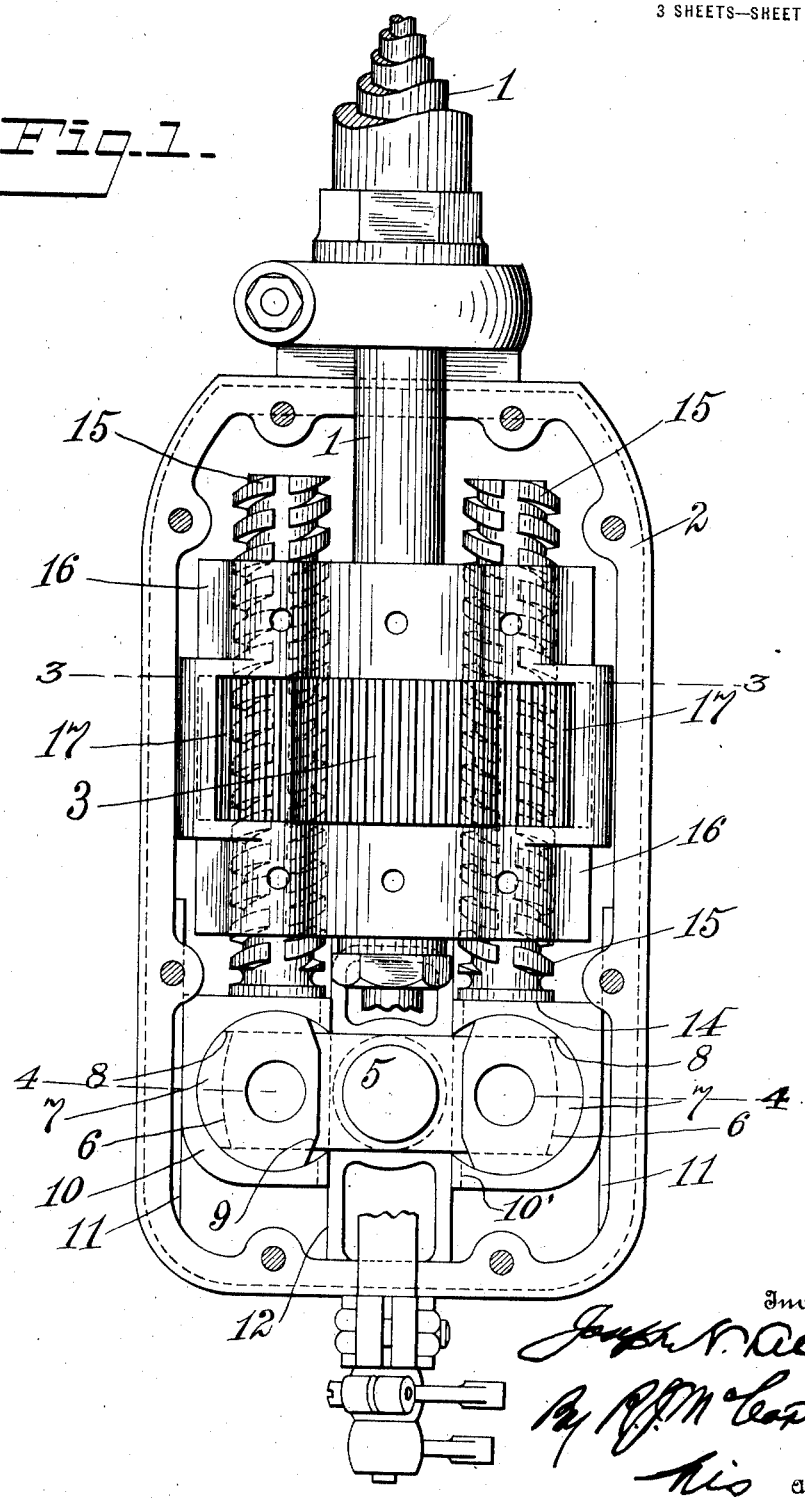
Figure 1 is a plan view of the steering mechanism, a part of the casing thereof being omitted.

The steering sleeve —1— extends from the well known steering wheel of an automobile neither of which is it necessary to illustrate or make more than a passing reference to. The said steering sleeve extends into the casing —2— which has a cover plate —2'— both of which combine to house the steering mechanism. The said sleeve —1— has fast thereon a relatively large spur gear —3— which is amply illustrated in Fig. 3 of the drawings. The steering arm —4— is fast to a rocker shaft —5— which is guided in and supported by extended bearings —12— integral with the casing —2— and cover plate —2'—.

At the end of the rocker shaft —5— opposite to which the steering arm —4— is attached, there is fixed a cross arm —6— which projects in opposite directions from the rocker shaft as is amply shown in Fig. 7. The ends of the said cross arm extend into transverse openings —8— of the oscillating members —7—, the inner edges of which are tapered or cut out as at —9— in order to provide necessary clearance for the ends of the cross arm —6— when it is rocked out of a straight position. The oscillating members —7— are received by slidable members —10— in which they freely oscillate. These holders —10— lie between guide surfaces —11— in the casing —2— and inner guide bearings —12— that extend from the cover plate —2'—, and the said holders thus have definite movement when acted upon as will be presently described in connection with the screw shafts. The matching or corresponding surfaces of the parts —7— and —10— permit of an easy and free movement of the said parts —7—. The inner edges of the holding members —10— have cuts —10'— which provide clearances for the ends of the cross arm —6—. The flat sides —13— of the said holding members —10— abut with the straight ends —14— of screw shafts —15— which are shown to be oppositely threaded. A large nut —16— is adjustably held in the casing —2— and the screw shafts pass through the separated portions thereof. A large bearing surface for said screw shafts is thus obtained as they move in straight lines through the said nut —16—. The large spur gear —3— before referred to is prevented from having any lateral movement by the separated parts of the nut —16—. The said spur gear —3— engages spur pinions —17— which are splined to the screw shafts —15—. As shown in Fig.

2 the said screw shafts have longitudinal cuts —18— through the threads thereof and in these cuts a projection or key from the pinions —17— may ride. The pinions —17— are carried between the separated parts of the nut —16— and are thus maintained properly in line with the large gear —3—. When the sleeve —1— is turned by the steering wheel the large spur gear —3— is given thereby a corresponding movement and the pinions —17— are rotated to similar extents and in the same direction. The oppositely threaded screw shafts —15— rotate with said pinions —17—, but the threads of the nut —16— compel the screw shafts to move longitudinally in opposite directions. In Fig. 1, the particular screw shaft which moves to the left engages the holding member —10— and pushes against it, thereby rocking the cross arm —6— and the rocker shaft —5— and thus moving the steering arm —4— which is connected to the steering wheels of the vehicle in a well known manner. When either of the screw shafts thus actuates one or the other of the holding members —10—, the oscillating members —7— turn in opposite directions in the holding members —10— and the cut away portions —9— and —10′— of said oscillating and holding members enable a free and proper movement to be thus imparted to the cross arm —6— and thence to the rocker shaft —5—. When the cross arm —6— is moved by the engagement of one or the other of the said screw shafts with one or the other of the slidable members —10—, the slidable member at the other end of the said cross arm will follow in contact with the end of the other screw shaft and a constant contact is maintained between the ends of the screw shafts and the slidable holding members —10— so that no idle or loose movement takes place between the parts in the operation of the mechanism.

The invention as described and illustrated provides for larger bearing surfaces between the ends of the screw shafts and the rocker arm. This results in a greater durability of the mechanism and greater life as well as ease of operation. In other respects the steering mechanism is substantially the same as that shown and described in my former patent to which reference has been made.

Having described my invention and pointed out the manner of its operation, I desire to claim:

1. In a steering mechanism, the combination with a steering sleeve, of screw shafts, a gear fixed to the steering sleeve, oppositely positioned pinions engaged by said gear and splined to said screw shafts, a cross arm, oscillatory members engaged by said cross arm, slidable members inclosing said oscillatory members and engaged by the ends of the screw shafts, and means actuated by the cross arm to turn the steering wheels of a vehicle.

2. In a steering gear, the combination with a gear driven from the steering wheel of an automobile, pinions meshing with said gear, oppositely threaded screw shafts to which said pinions are splined, a rocker shaft, a cross arm fixed to said rocker shaft, slidable and oscillatory members interposed between the ends of said screw shafts and the ends of the cross arm, the slidable members being engaged by the screw shafts, and the oscillatory members being carried by the slidable members and engaged by the cross arm, and connections between the rocker shaft and the steering wheels of the automobile whereby the movements imparted to the cross arm from the screw shafts through the said slidable and oscillatory members are transmitted to said steering wheels.

3. In a steering gear, the combination with a gear connected with the steering wheel of a motor vehicle, two pinions separately engaged by said gear, oppositely threaded screw shafts upon which said pinions are splined, a rocking cross arm, oscillatory members engaging the ends of said cross arm, slidable members in which said oscillatory members are carried, said slidable members being in contact with the ends of the screw shafts, and connections between the said cross arm and the steering wheels of said motor vehicle.

4. In a steering mechanism, the combination with a rocker arm centrally pivoted, screw shafts, pinions splined to said screw shafts, a gear meshing with said pinions, and means for rotating said gear from a steering wheel, of slidable members engaged by said screw shafts, and oscillatory members carried by said slidable members and with which the ends of the rocker arm have a slidable engagement and whereby said rocker arm is actuated from the screw shafts in opposite directions.

5. In a steering mechanism for automobiles, the combination with a centrally pivoted rocker arm, oppositely threaded screw shafts, pinions splined to said screw shafts, a stationary nut having screw threaded portions engaged by said screw shafts, a gear engaging said pinions, and means for rotating said gear, of means interposed between said screw shafts and the ends of the rocker arm for actuating the rocker arm from the movements of the screw shafts, said means consisting of oscillatory members with which the ends of the rocker arm have slidable movements, and slidable members inclosing said oscillatory members and by means of which said oscillatory members are given the necessary movements to rock the rocker arm.

6. In a steering mechanism, the combination with a rocker arm pivoted midway of its length, screw shafts, pinions splined to said screw shafts, a gear engaging said pinions to rotate said screw shafts in opposite directions, and means for driving said gear, of slidable members open on one side actuated by said screw shafts, and oscillatory members carried by said slidable members and engaged by the ends of the rocker arm through the open sides of the slidable members whereby said rocker arm is rocked on its pivot by the screw shafts.

7. In a steering mechanism, the combination with a centrally pivoted rocker arm, of two oppositely threaded screw shafts having ends terminated in flat surfaces, two slidable members having flat surfaces of greater area engaged by the flat surfaced ends of the screw shafts, oppositely disposed guides for said slidable members, and two oscillatory members having a pivotal support in said slidable members, said oscillatory members having openings which receive the ends of the rocker arm and whereby the said rocker arm is actuated on its pivot from the movement of the screw shafts.

8. In a steering gear, the combination with a rocker arm, two oppositely threaded screw shafts, and means for actuating said screw shafts from the steering wheel of an automobile, of a rocker shaft to which said rocker arm is attached, cylindrical oscillatory members engaging the ends of said rocker arm to actuate the same, and slidable members providing movable bearings for the said oscillatory members and whereby the last named members are caused to oscillate when the slidable members are actuated by the screw shafts and the rocker arm is rocked.

In testimony whereof I affix my signature.

JOSEPH N. KELLY.